(12) United States Patent
Schink et al.

(10) Patent No.: US 6,347,807 B1
(45) Date of Patent: Feb. 19, 2002

(54) PROTECTING ARRANGEMENT FOR THE HEAD AND SHOULDER REGION OF VEHICLE OCCUPANTS

(75) Inventors: Frank Schink, Grosselfingen; Ulrich Tschäschke, Ehningen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/592,853

(22) Filed: Jun. 12, 2000

(30) Foreign Application Priority Data

Jun. 10, 1999 (DE) .......................................... 199 26 269

(51) Int. Cl.[7] .............................................. B60R 21/22
(52) U.S. Cl. .................. 280/730.2; 280/749; 280/743.1
(58) Field of Search ........................... 280/730.2, 743.1, 280/743.2, 749, 753

(56) References Cited

U.S. PATENT DOCUMENTS

| | | | |
|---|---|---|---|
| 3,687,485 A | 8/1972 | Campbell | 280/150 |
| 3,774,936 A | 11/1973 | Barnett et al. | 280/150 AB |
| 5,865,462 A | * 2/1999 | Robins et al. | 280/730.2 |
| 6,073,961 A | * 6/2000 | Bailey et al. | 280/730.2 |
| 6,129,377 A | * 10/2000 | Okumura et al. | 280/730.2 |
| 6,152,481 A | * 11/2000 | Webber et al. | 280/730.2 |
| 6,224,091 B1 | * 5/2001 | Eyrainer et al. | 280/730.2 |

FOREIGN PATENT DOCUMENTS

| | | |
|---|---|---|
| DE | 195 19 297 A1 | 12/1996 |
| DE | 197 04 051 A1 | 8/1998 |
| DE | 299 03 778 U1 | 8/1999 |
| EP | 0 814 001 A1 | 6/1997 |

OTHER PUBLICATIONS

European Search Report dated Nov. 7, 2000, with partial English translation.

* cited by examiner

Primary Examiner—Lanna Mai
Assistant Examiner—Christopher Buchanan
(74) Attorney, Agent, or Firm—Crowell & Moring LLP

(57) ABSTRACT

In order to tighten a side air bag in the gas-filled condition, viewed in the driving direction, this side air bag is held on its forward air bag portion by way of a catch string and, on the rearward air bag portion, by way of a tightening string on respective columns of the vehicle occupant compartment. The tightening string is guided by way of a first stationary deflection member provided in the lateral roof edge area as well as around a second deflection member provided on the side air bag in it lower edge area, which second deflection member is situated between the two fastening points of the tightening string, on the one side, on a column of the vehicle occupant compartment and, on the other side, on the side air bag.

11 Claims, 2 Drawing Sheets

PROTECTING ARRANGEMENT FOR THE HEAD AND SHOULDER REGION OF VEHICLE OCCUPANTS

BACKGROUND AND SUMMARY OF THE INVENTION

This application claims the priority of German Patent Document 199 26 269.1, filed Jun. 10, 1999, the disclosure of which is expressly incorporated by reference herein.

The invention relates to a protecting arrangement for the head and shoulder region of vehicle occupants in the event of a side impact or an oblique impact. Preferred embodiments of the invention relate to protecting arrangements of this type having a side air bag which can be inflated by means of a gas generator and which, in the folded condition, is stowed in the lateral roof edge area of a vehicle body and which, in the inflated condition, forms a cushion-shaped lateral impact protection device and, viewed in the driving direction, by means of its forward and rearward air bag portion, is anchored in its lower edge area by way of connection elements on one column respectively of the vehicle occupant compartment.

A protecting arrangement of this type is known from European Patent Document EP 0 814 001 A1. The air bag, which is deposited in the folded state in the lateral roof edge area, when being activated, extends from the upper roof edge area downward and, in the process, while forming an impact cushion, covers the upper door frame or window frame.

Viewed in the driving direction, the air bag is anchored by means of its forward and rearward air bag portion in its lower edge area by way of band-type connection elements on one column respectively of the vehicle occupant compartment. If, in the process, the air bag extends, for example, along the whole interior side of the vehicle, the connection elements are linked to the A-column and the C-column, their fastening point at the air bag, during the filling of the air bag by means of a gas generator, describing a circular arc around the column-side linking point of the connection elements.

As the result of the linking of the air bag to two columns of the vehicle occupant compartment, a guiding of the air bag during the filling operation which is close to the side wall is achieved, on the one hand, and, on the other hand, as the result of constricted areas of the air bag and thus as the result of a special shape of the impact cushion during the inflating and the connected shortening of the impact cushion between the two anchoring points in the longitudinal direction of the air bag, a defined course of the tension or such a tightening is achieved.

However, such a shortening of the impact cushion which, in cooperation with the connection elements, causes the tensioning of the cushion, is limited in the case of a long layout of the air bag and a shorter air bag length caused, for example, by the spacing of the A-column and the B-column.

This is the starting point of the invention. It is based on the object of indicating a protecting arrangement of the type referred to above which, in the case of any dimensioning of the air bag, ensures a tightening of the latter in the inflated condition without any additional measures, such as the special constricting, in areas, of the impact cushion or the use of a pyrotechnical or spring-force-operated tightening device according to German Patent Document DE 195 19 297 A1.

According to the invention this object is achieved by providing an arrangement of the above noted type wherein at least one of the connection elements is flexible and is guided by way of a first stationary deflection member provided in the lateral roof edge area as well as around at least one second deflection member provided on the side air bag in its lower edge area, which second deflection member is situated between the two fastening points of the connection element.

By means of the guiding according to the invention of one of the connection elements by way of a stationary deflection member provided in the lateral roof edge area as well as around a deflection member arranged on the air bag between both fastening points of the connection element, it is achieved that, when the air bag is unfolding downward when being filled with gas, the air-bag-side fastening point as well as the deflection member provided on the air bag, together, are also displaced downward relative to the stationary deflection member arranged in the lateral roof edge area. In this case, the connection element preferably forming a tightening string is tightened in the course of the activating of the air bag, in which case, as the result of the supporting of the string segment extending between the stationary upper deflection member and the column-side anchoring point by way of the deflection member fastened on the air bag, a resulting force is transmitted to the air bag, which attempts to pull the air bag in the direction of the column of the vehicle occupant compartment, at which this string segment is fastened.

In cooperation with the other connection element applied to the air bag, this results in a tightening of the air bag which fixes the air bag momentarily on the interior side wall of the vehicle occupant compartment.

The advantage of an optimally effective air bag tensioning is provided in certain preferred embodiments of the invention, wherein, in the case of the inflated side air bag, the air-bag-side and column-side fastening points the connection elements as well as its air-bag-side deflection member are situated essentially in a common horizontal plane.

Certain preferred embodiments of the invention permit the use of a tightening string of the shortest length which is important with respect to the space requirement for the folded air bag by providing an arrangement wherein the stationary deflection member provided in the roof edge area is arranged approximately in the center between the air-bag-side fastening point and the air-bag-side deflection member of the connection element.

The air bag can extend between two adjacent columns of the vehicle occupant compartment or along the area situated between the A-column and the C-column. In each case, it is advantageous to fix the connection element guided by way of the upper stationary deflection member on the vehicle occupant compartment held at the rearward column, because then the distance between the column-side fastening point and the air-bag-side deflection member can remain relatively small.

If the air bag is to be positioned only between the A-column and the B-column, an advantageous construction is obtained, wherein, by means of the side air bag, at least the side window of the vehicle occupant compartment existing between the A-column and the B-column as well as, at least in areas, the A-column can be covered because in this case an effective protection of the head is simultaneously achieved in the event of an impact against the A-column.

Other objects, advantages and novel features of the present invention will become apparent from the following detailed description of the invention when considered in conjunction with the accompanying drawings.

DETAILED DESCRIPTION OF THE DRAWINGS

Figure 1:
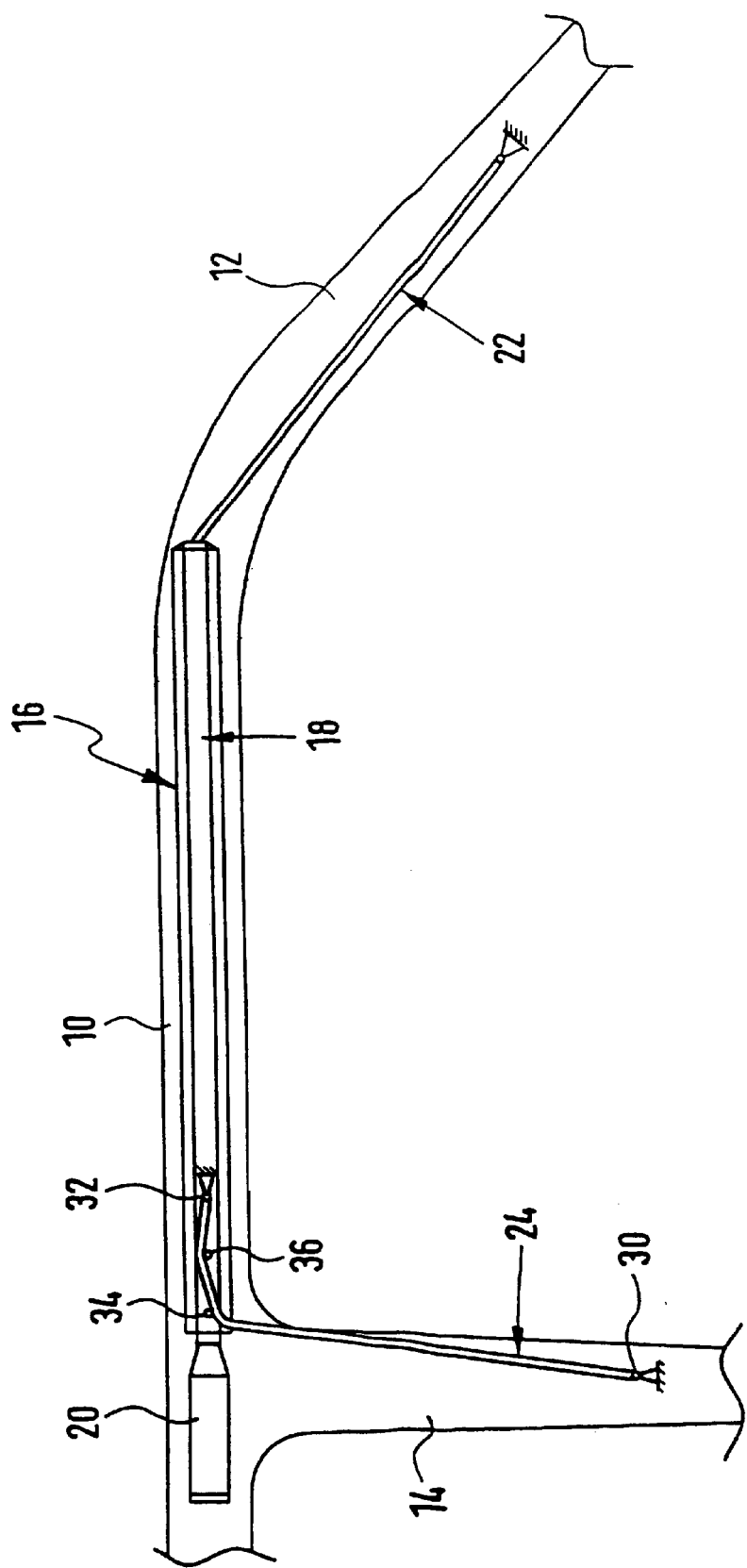
FIG. 1 is a lateral view of a protecting arrangement with an air bag stowed in a lateral roof edge area of a vehicle occupant compartment and constructed according to a preferred embodiment of the invention.

Reference number 10 indicates a section of a roof side member of a passenger car; reference number 12 indicates an A-column adjoining the roof side member; and reference number 14 indicates a B-column. Reference number 16 indicates a protecting arrangement for the head region and the shoulder region of vehicle occupants as a whole, which has a side air bag 18 extending, for example, from the A-column 12 to the B-column 14. This side air bag 18 may also extend to a C-column or between the C-column and the B-column 14.

In the non-activated condition, the side air bag 18 is stored in a folded fashion so that it is hidden under a covering of the A-column and the B-column 12 and 14 as well as of the lateral roof side member 10. In a known manner, a gas generator 20 is connected to the side air bag 18, which gas generator 20 can be triggered by a sensor and is preferably also installed in the roof side member 10.

Figure 2:
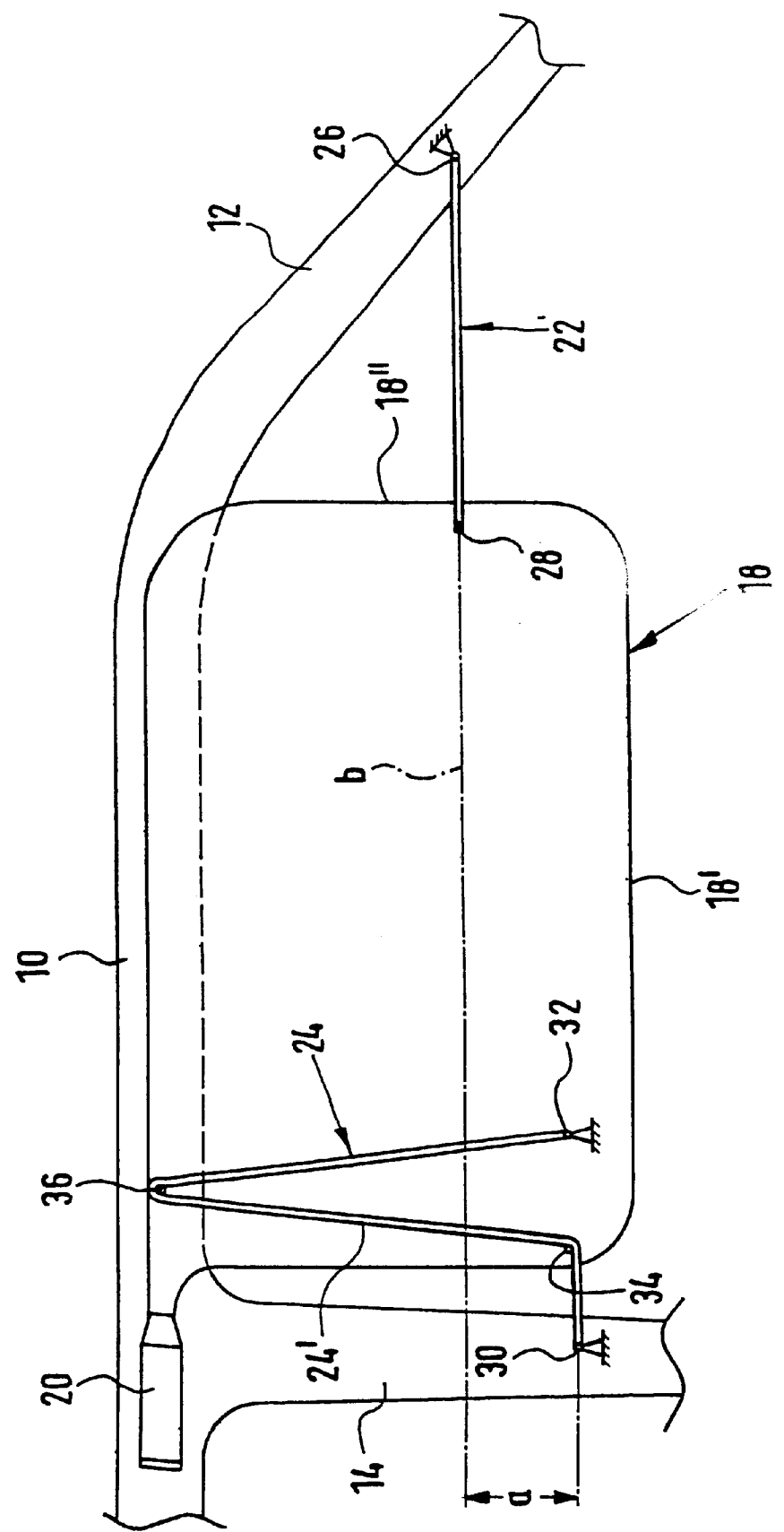
FIG. 2 is a schematic representation corresponding to FIG. 1, the air bag being illustrated in the inflated and laterally braced condition.

As illustrated in FIG. 2, viewed in the driving direction, the side air bag 18 is connected at its forward and rearward air bag part, in the area of its lower edge part 18', with one connection element 22 and 24 respectively.

While the connection element 22, preferably in the form of a catch string, is fastened at reference number 26 on the A-column 12 and at reference number 28 close to the forward edge part 18" of the air bag 18, the connection element 24 forms a tightening string which braces the air bag 18 in the gas-filled condition in the plane of the drawing.

For this purpose, the tightening string 24 is fastened by means of its one end, preferably at a distance a below a horizontal plane b containing the fastening points 26 and 28 of the catch string 22, on the B-column 14 at reference number 30 and, by means of its other end, at reference number 32, in the area of the lower edge part 18' of the air bag 18 and is guided around two deflection members 34 and 36 vertically offset with respect to one another.

The deflection member 34 is fastened approximately in the center and essentially in the same horizontal plane as the fastening points 30, 32 of the tightening string 24 between these fastening points 30, 32 on the air bag 18, while the deflection member 36 is preferably positioned on the roof side member 10 such that it is situated approximately in the center between the fastening point 32 provided on the air bag side and the air-bag-side deflection member 34.

Naturally, the explained arrangement of the tightening string 24 may also be such that its fastening point 30 is on the A-column 12.

As illustrated in FIG. 2, the catch string 22 and the tightening string 24 are situated behind the covering of the A-column and the B-column 12 and 14 when the protecting arrangement 16 is not activated.

In the event of an impact from the side or obliquely from the front, the gas generator 20 is activated and the side air bag is inflated, the side air bag moving downward in the vertical direction when inflating. In this case, it is simultaneously held on both front ends by the catch string 22 and the tightening string 24 in the filling end phase, is tightened in the longitudinal direction and, as the result, is placed against the window portion to be covered.

The tightening of the resulting impact protection device is achieved as follows: When the side air bag 18 is unfolded, a relative movement takes place of the fastening point 32 of the tightening string 24 and of the deflection member 34 with respect to their column-side fastening point 30 as well as with respect to the roof-member-side stationary upper deflection member 36, with the result that the tightening string 24 is pulled over the upper deflection member 36. The segment 24' of the tightening string 24, which is present between the column-side fastening point 30 as well as the upper deflection member 36 and is guided around the air-bag-fixed deflection member 34, endeavors to stretch in this case, from which it is, however, prevented by means of the deflection member 34. This tightening string segment 24' therefore transmits a resulting force to the deflection member 34 which attempts to displace it radially diagonally upward in the direction of the B-column 14. Because of the reaction force generated by the catch string 22, this results in the desired tightening of the air bag 18.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Protecting arrangement for the head and shoulder region of vehicle occupants in the event of a side impact or an oblique impact comprising:
   a side air bag which can be inflated by a gas generator and which, in the folded condition, is stowed in a lateral roof edge area of a vehicle body, and which in the inflated condition, forms a cushion-shaped lateral impact protection device,
   connection elements operable to anchor lower parts of the side air bag to columns of the vehicle body when the air bag is in the inflated condition,
   wherein said connection elements include a first connection element having one end fixed to a lower part of the air bag and an opposite end fixed to one of the columns, and
   wherein said first connection element is flexible and is guided by way of a first stationary deflection member provided in the lateral roof edge area as well as around at least one second deflection member provided on a lower part of the side air bag, which second deflection member is situated between the ends of the first connection element.

2. Protecting arrangement according to claim 1,
   wherein, when the side air bag is inflated, the ends of the first connection element as well as the second deflection member are situated substantially in a common horizontal plane.

3. Protecting arrangement according to claim 1,
   wherein the stationary deflection member provided in the roof edge area is arranged substantially centrally in relation to fixed ends of the first connection element.

4. Protecting arrangement according to claim 1,
   wherein the side air bag extends at least between two columns of the vehicle occupant compartment, and
   wherein said first connection element is fixed to a rearward column of the two columns in relation to a forward driving direction.

5. Protecting arrangement according to claim 4, wherein, by way of the side air bag, at least a side window of the vehicle occupant compartment arranged between an A-column and a B-column as well as a portion of the A-column can be covered.

6. A vehicle assembly comprising:

a vehicle occupant space provided with longitudinally spaced vertical body columns, a window section between the body columns, a vehicle roof having a lateral roof edge area connected to and extending between upper ends of the body columns, a side air bag which in a stowed condition is disposed in the lateral roof edge area and in an inflated condition is expanded downwardly of the roof edge area to form a protective cushion for vehicle occupant head and shoulder areas, and connection elements operable to anchor lower parts of the air bag at the columns when in an inflated condition, wherein said connection elements include a first flexible connection element having one end fixed to a lower part of the air bag and an opposite end fixed to one of the columns, and wherein, intermediate its ends, said first flexible connection element is guided over a first deflection member in the lateral roof edge area and a second deflection member at a lower part of the air bag between the ends of the first flexible connection element.

7. A vehicle assembly according to claim 6, comprising a second connection element with one end fixed to a lower portion of the air bag and opposite end fixed to another of the body columns.

8. A vehicle assembly according to claim 7, wherein the second deflection element and the attachment of the first connection element to the air bag are disposed below the attachment of the second connection element with the air bag.

9. A side air bag assembly for protecting head and shoulder regions of vehicle occupants in a vehicle occupant space provided by longitudinally spaced body columns, a window section between the body columns, and a vehicle roof having a lateral roof edge area connected to and extending between upper ends of the body columns, said side air bag assembly comprising:

a side air bag which in a stowed condition is disposed in the lateral roof edge area and in an inflated condition is expanded downwardly of the roof edge area to form a protective cushion for vehicle occupant head and shoulder areas, and connection elements operable to anchor lower parts of the air bag at the columns when in an inflated condition, wherein said connection elements include a first flexible connection element having one end fixed to a lower part of the air bag and an opposite end fixed to one of the columns, and wherein, intermediate its ends, said first flexible connection element is guided over a first deflection member in the lateral roof edge area and a second deflection member at a lower part of the air bag between the ends of the first flexible connection element.

10. A side air bag assembly according to claim 9, comprising a second connection element with one end fixed to a lower portion of the air bag and and opposite end fixed to another of the body columns.

11. A side air bag assembly according to claim 10, wherein the second deflection element and the attachment of the first connection element to the air bag are disposed below the attachment of the second connection element with the air bag.

\* \* \* \* \*